Dec. 12, 1944.  H. REISSNER  2,364,871
PROPELLER CONSTRUCTION FOR AIRCRAFT OR THE LIKE
Filed Feb. 26, 1942  6 Sheets-Sheet 4
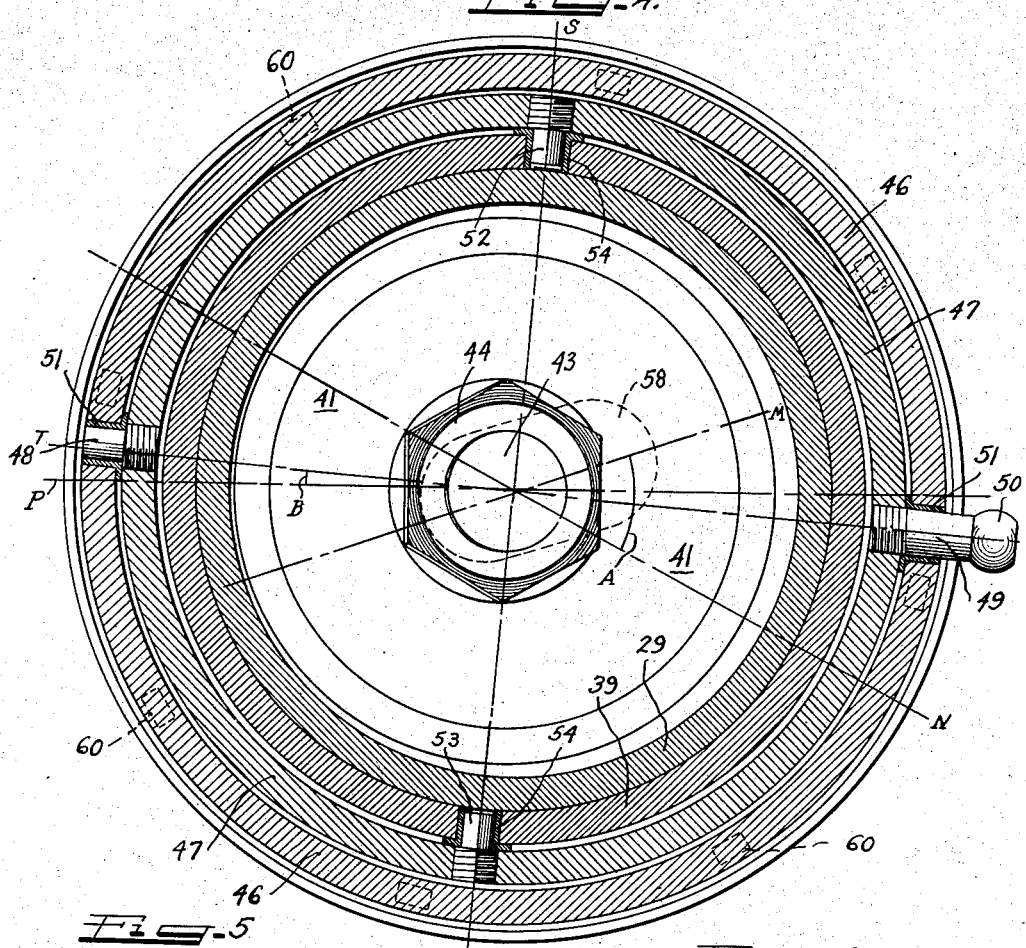
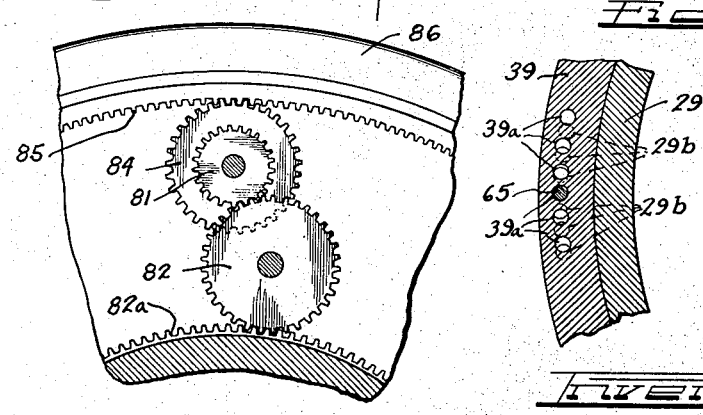
Inventor
HANS REISSNER.

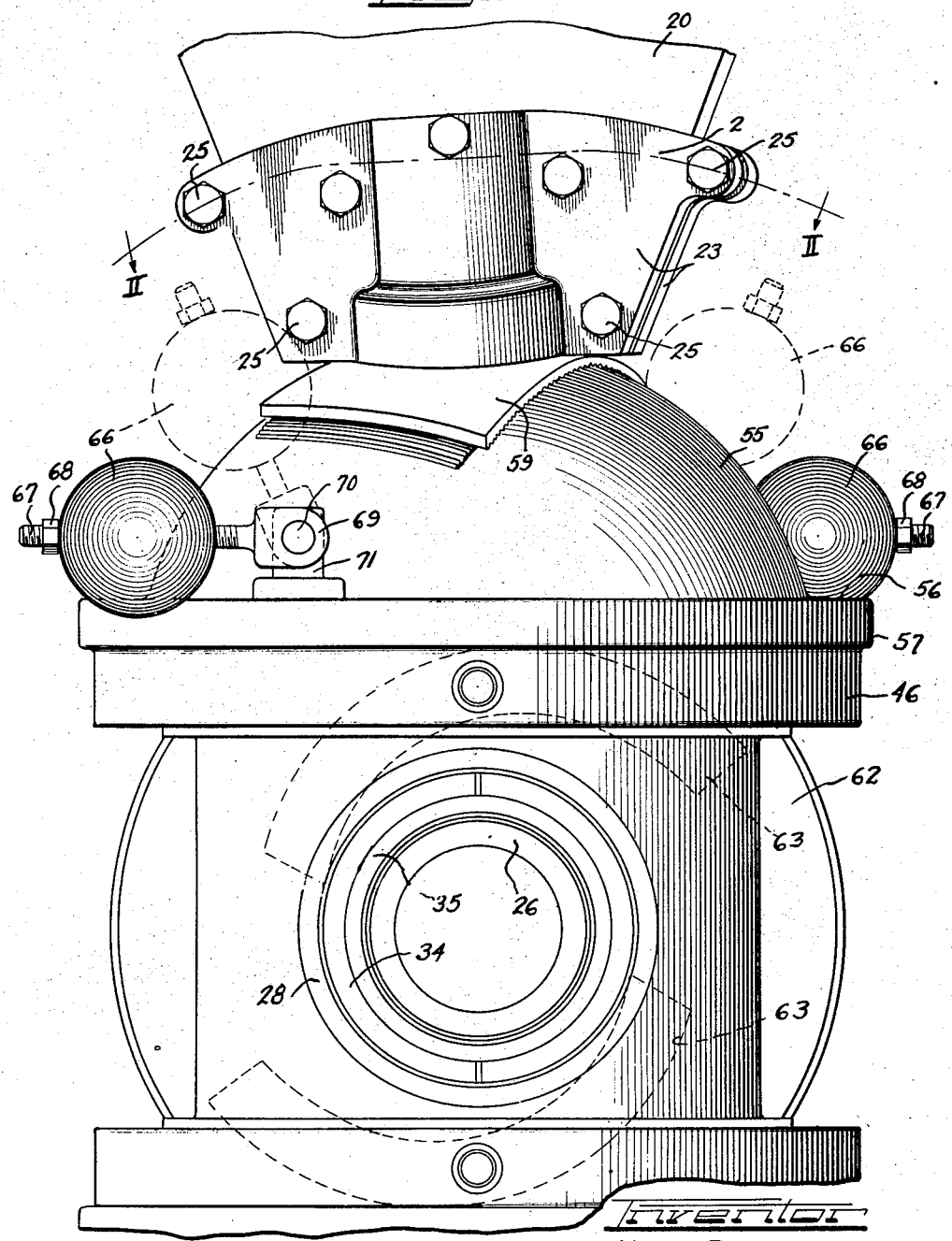

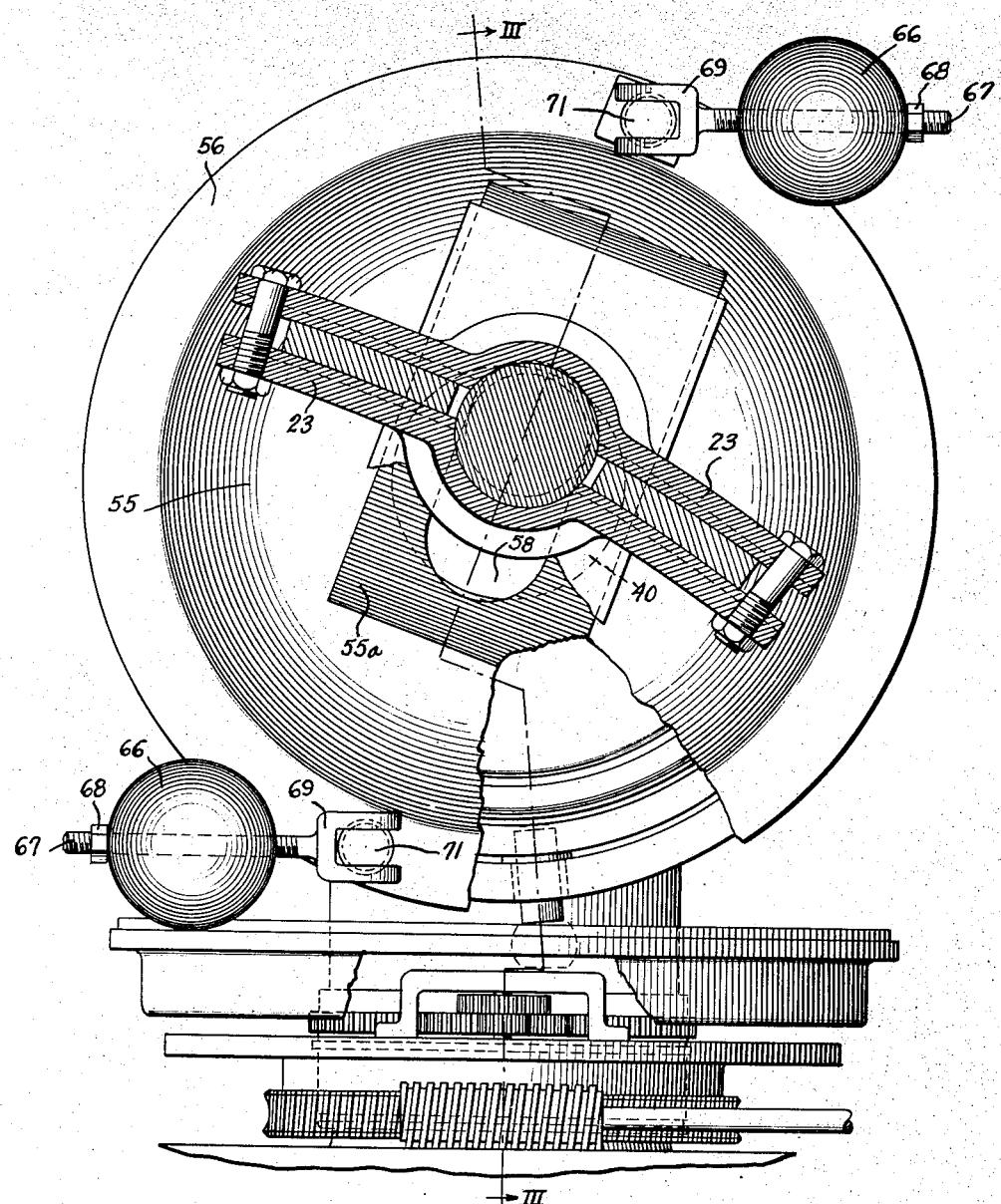

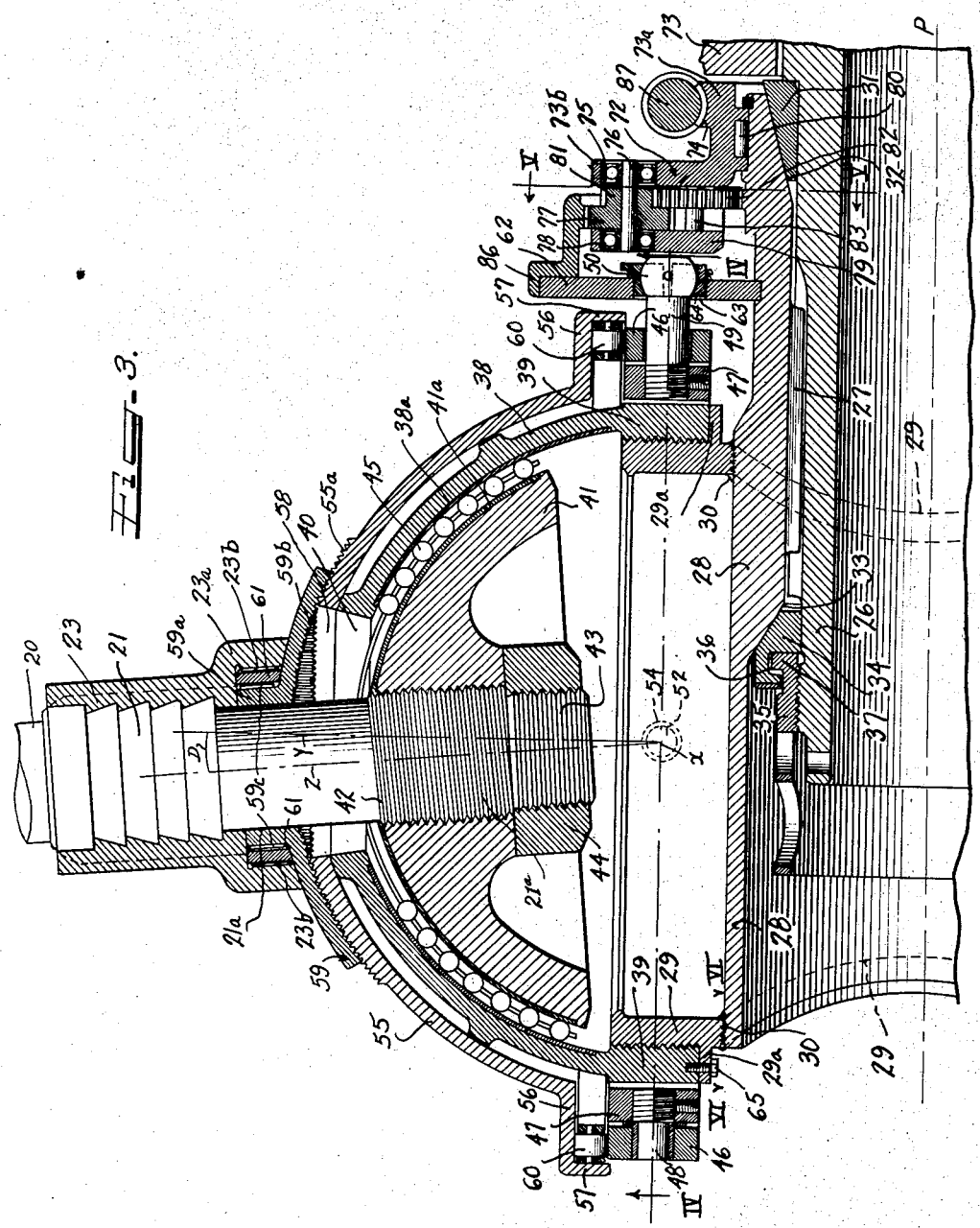

Dec. 12, 1944.    H. REISSNER    2,364,871
PROPELLER CONSTRUCTION FOR AIRCRAFT OR THE LIKE
Filed Feb. 26, 1942    6 Sheets-Sheet 5

Inventor
HANS REISSNER.
by
Charles Hill
Attys.

Dec. 12, 1944  H. REISSNER  2,364,871
PROPELLER CONSTRUCTION FOR AIRCRAFT OR THE LIKE
Filed Feb. 26, 1942  6 Sheets-Sheet 6

Inventor
HANS REISSNER.
by Charles Hill
Attys.

Patented Dec. 12, 1944

2,364,871

UNITED STATES PATENT OFFICE 2,364,871

PROPELLER CONSTRUCTION FOR AIRCRAFT
OR THE LIKE

Hans Reissner, Chicago, Ill.

Application February 26, 1942, Serial No. 432,376

16 Claims. (Cl. 170—162)

This invention relates to a propeller construction for aircraft or the like, and is directed particularly to an improved construction which may be initially adjusted in accordance with the factors inherent in the plane to which it is attached and thereafter the blades thereof may automatically adjust themselves in an improved manner in response to variable flight factors in accordance with changes in flight conditions.

One of the important objects of my invention is to provide an arrangement of the above character which affords automatic adjustments of the mechanism during flight so that a high number of states of flight with prescribed revolutions and engine horsepower can automatically be obtained without governor or pilot control.

It is a further object of the invention to provide a mechanism which, in addition to providing for a high number of states of flight, as above explained, further provides for automatic movement of the blades into feathering position in the event that the engine of the airplane functions slowly or ceases to function, as when the plane goes into a glide or dive without power, or with little power.

Another important object of the invention is to provide a propeller construction of the above character with improved means for centrifugally damping the development of flutter in the propeller assembly.

More specifically, an object of the invention is to provide a propeller construction with improved means for affording adjustments prior to flight, which adjustments are to be made in accordance with the expected performance of the airplane in regard to sets of forward speed of available engine torque, required rotational speed and corresponding propeller thrust, whereby the rotational speed produces, as the significant factor, a centrifugal force proportional to the square of the rotational speed. The expected performance may be computed beforehand from the aerodynamic and power characteristics of the airplane.

Furthermore, a specific object of the invention is to provide a novel and improved propeller construction wherein the position of the blades relative to their mounting automatically varies to compensate for variations in engine torque, centrifugal force and thrust of the propeller, thereby affording different constant speeds of the propeller in respective different states of flight.

Another specific object of the invention is to provide an improved adjustable propeller construction wherein bending moments at the root of the blade or the connection thereof with the hub are reduced to a minimum whereby self-balancing movements of the blades under the effects of torque, centrifugal force and thrust are accomplished through a freely tilting movement of each blade relative to the mounting elements at the root thereof with the only constraint of an appropriate change of the blade angle.

Still another object of the invention is to provide, in conjunction with a mechanism of the above character, an improved device affording, during flight, further adjusting movements of one of the initial preflight adjustments to obtain a fine correction of a given rotational speed to avoid critical resonance or to synchronize the several propellers of a multi-engine aircraft; serving furthermore to turn the blades into such a small or negative pitch that backward thrust is obtained, whereby readjustment of the device brings an instantaneous return to the normal positive pitch and thrust; to afford an adjustment during gliding with the engine stopped and with the blades in feathering position whereby the blades are moved into windmilling position to start the engine and for adjusting the mechanism to accommodate other states of flight than those provided for by the pre-flight adjustments.

Another object of the invention is to utilize counterweights which are fastened on the bearing of the blade to intercept the centrifugal and aerodynamic couples acting about the longitudinal axis of the blade and for a second purpose, to effect an inertia damping of the critical flutter or resonance speed of the blade. This is accomplished by arranging them as pendulums tuned to a natural frequency equal to the frequency of critical speed. It must be noted that the utilization is only possible in combination with the tilting and twisting oscillation of the blade root bearing peculiar to the hinge construction of the present invention.

Many other objects and advantages of the invention will become apparent from the following specification and the accompanying drawings, in which:

Figure 1 is a fragmentary elevational view of the bearing mounting of a propeller assembly constructed in accordance with my invention, looking along the axis of a propeller shaft upon which it is mounted;

Figure 2 is a cross-sectional view taken along the line II—II of Figure 1 in which, however, the differential control to be described presently, has been reversed in position for purposes of clarity;

Figure 3 is a cross-sectional view taken along the broken line III—III of Figure 2;

Figure 4 is a cross-sectional view taken along the line IV—IV of Figure 3, the relative position of the longitudinal axis of the propeller shaft being indicated at P;

Figure 5 is a cross-sectional view taken along the line V—V of Figure 3;

Figure 6 is a cross-sectional view taken along the line VI—VI of Figure 3;

Figure 7:
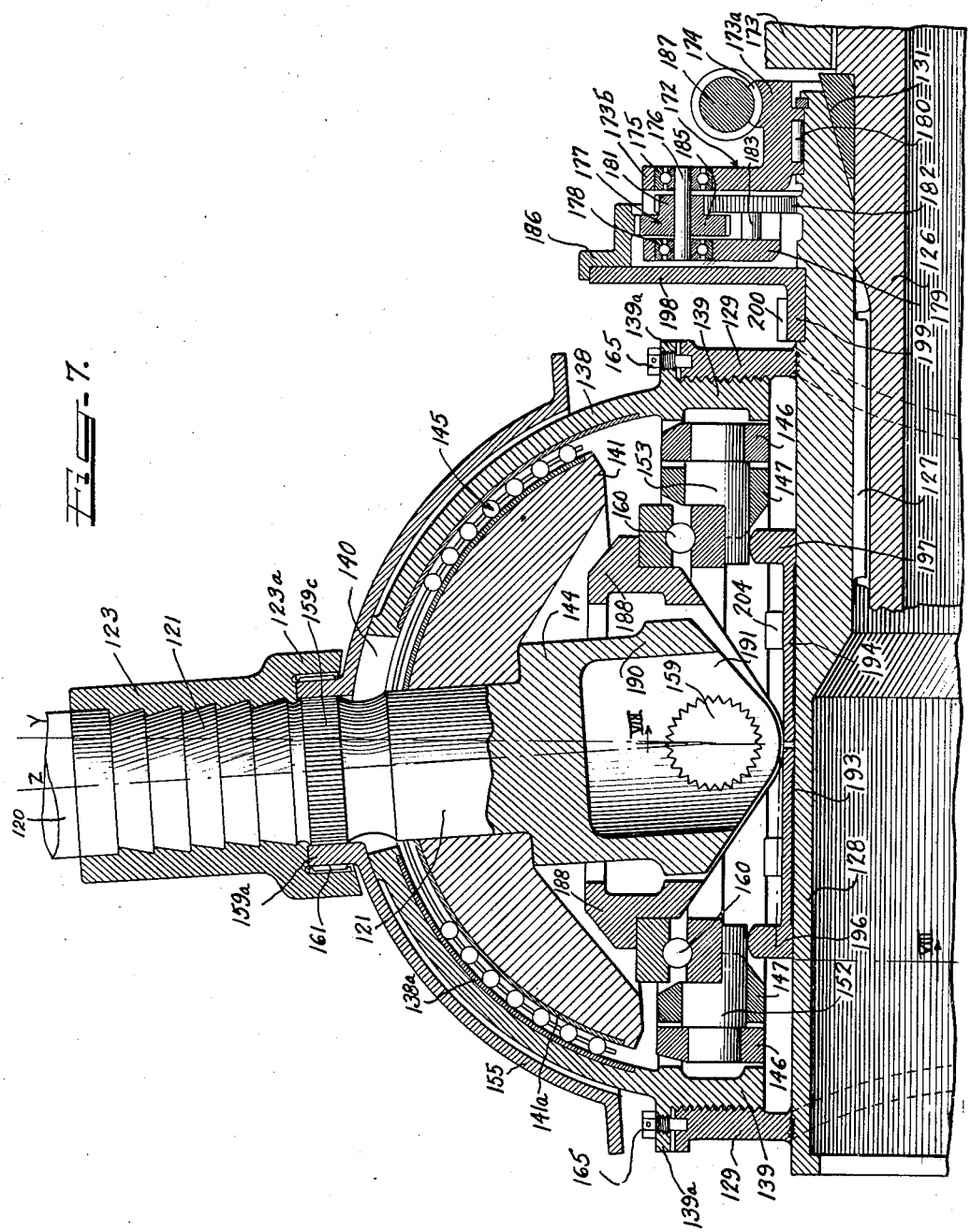
Figure 7 is a cross-sectional view taken parallel to the axis of the propeller shaft, of a modified form of my invention.

For purposes of clarity, the various adjustments of the propeller blades with respect to the axis of the propeller shaft will be divided into two classes. First, that class which includes adjustments to be made prior to flight and to establish the initial conditions by which automatic self-balancing blade movements are accomplished. Second, those subsequent self-balancing movements of the blades which occur during flight to seek and find the equilibrium between centrifugal force, thrust and torque to be accompanied by the blade pitch angle appropriate for the requirements of forward speed and rotational speed.

With the present mechanism, the pre-flight adjustments which are ordinarily made by the propeller mechanic presuppose first the correct determination of an angle between a representative chord of the propeller blade and the long median M of a slot 58, Fig. 4, in a partly spherical bearing to which the blade may be adjusted (which slot will be further described presently); secondly, the correct determination of the angle, in a horizontal plane (as seen in Figure 4) through the axis of the engine shaft perpendicular to the radial hub axis, between the center line of an adjustment pin (to be described presently) and the axis of the engine shaft; the correct determination of the angle in a plane (as seen in Figure 3) through the axis of the engine shaft and the radial hub axis between the center line of said adjustment pin and the axis of the engine shaft; and, the correct determination of the angle between the longitudinal centroid of the blade and the vertical axis (as seen in Figure 3) of the journal bearing 56, 60 and 46 upon which the blade is mounted.

With regard to the above adjustments, it might further be mentioned that with a mechanism such as that here disclosed an additional adjustment is obtained coincident with the adjustment of the angle lying in a horizontal plane, between the center line of the pin and the center line of the engine shaft, since during this adjustment the mechanism rides upon a screw thread and thereby the distance between the center of the spherical thrust bearing and the axis of the propeller shaft is lengthened or shortened in accordance with the direction of the adjustments tending to regulate said angle. The depth of the threaded portions may, of course, be varied to meet with the conditions required.

In making the above pre-flight adjustments, it is contemplated that under certain circumstances, computations and calculations may be corrected by trial or test flights, after which further, finer adjustments of the elements involved may be made.

The foregoing pre-flight adjustments having been made, the mechanism is so constructed and arranged that the propeller blades may further move, through a guided action, the longitudinal axis of each to describe a cone about a given axis, the latter also being movable, both under influence of changes of relation between centrifugal force, thrust and torque to provide self-balancing positions whereby the pitch angle of the blade is so guided as to insure just the required engine speed at the expected (pre-calculated) thrust and the enforced engine torque.

Referring particularly to Figures 1 to 6, inclusive, which disclose one form of mechanism embodying my invention, 20 represents the inner or root portion of a propeller blade having a blade pin 21 associated therewith, the latter having a step formation on the outer surface thereof so configurated that when engaged by like configurations upon the two clamping pieces 23 at the extreme root end of the blade, the assembly being secured together by means of clamping bolts 25, the respective blades 20 will be held securely together against detachment from its mounting assembly under the influence of centrifugal force developed as the propeller aggregate is rotated by the engine. The plates 23 and the blades 20 are suitably apertured to receive bolts 25 whereby the above described parts are securely held together as a unit. It will be readily understood that the above construction permits of relative rotation between the propeller blade and its mounting assembly in a manner, and for purposes to be explained presently.

The propeller shaft assembly includes a hollow shaft portion 26 which may be driven by any suitable source of power in a conventional manner. Secured to the engine shaft as by splines 27 is a sleeve member 28 having a tube 29 outwardly threaded, as shown in Figure 1, to receive each of the blades in the complete propeller assembly. Each annulus 29 is secured to the sleeve member 28 in any suitable manner, such as by a weld joint 30.

Any suitable means may be provided for securely attaching the sleeve member 28 to the propeller shaft, and in the particular construction shown, this being the standard design recommended by the A. S. A. E., there is provided an annular wedge member 31 which engages in a recess afforded by the adjacent portion of the surface of the propeller shaft 26 and a rearward angular face 32 on the sleeve. An oppositely disposed angular face 33 is provided forwardly of the face 32 and in the vicinity of the end of the propeller shaft. To the end that the sleeve may be fitted tightly with the propeller shaft, a locking ring 34 having an inwardly disposed angular face adapted to engage with the face 33 of the sleeve is disposed slidably on the forward end of the shaft and is pressed into position to provide a wedging action by means of a fastening nut 35 which is threaded on to the end of the propeller shaft. In order that rotation of the nut will withdraw the ring 34 as well as to press it into wedging engagement with the sleeve and the shaft, the ring 34 is provided with a recess 36 into which a flange 37 of the nut 35 engages. It will be understood, of course, that in order that the ring 34 and the nut 35 may be engaged with one another, the ring may be split to provide for its expansion to permit the entrance of the flange 37 into the recess 36.

The adjustable mounting assembly disclosed in detail in Figures 3 and 4 will now be described, it being understood that a like assembly is provided about the sleeve 28 for each of the propeller blades included in the propeller assembly.

The main support for the propeller blade against the action of centrifugal force is a thrust shell 38 which in principle must be spherical, and is shown in hemispherical form, and has a marginal edge of increased thickness as at 39, which is inwardly threaded to securely engage with the outwardly threaded tube 29. The shell 38 is further provided at its crown portion with a concentric circular opening 40 for receiving the respective blade bolts 21 throughout its adjusting movements to be described presently.

Disposed inwardly of the thrust shell 38 is a substantially hemispherical nut 41 which is provided with an internally threaded, concentrically disposed aperture for receiving the root end 21a of the respective blade bolt 21 which is externally threaded as at 42 to engage with the nut 41. The blade bolt 21 is further provided at its extreme root end 21a with the reduced portion 43 which is threaded to receive an internally threaded lock nut 44 for maintaining secure assembled relationship between the blade bolt and the nut 41.

To the end that free swivel movement may be obtained between the shell 38 and the nut 41, there is disposed therebetween a suitable ball bearing system 45, the outer surface of the nut 41 and the inner surface of the thrust shell 38 being provided with hard steel liners 41a and 38a, respectively, to avoid hardening and brittleness of the vital carrying parts of the blade.

From the foregoing, it will be seen that there is provided herein a basic, bearing mounting for the propeller blades which permits relative movement of the respective blades about its mounting assembly with the center of the bearing 38 the point X shown in Figure 3 as the pivotal point.

To the end that pre-flight adjustments may be accomplished, as set forth above, and to the end that the automatic self-balancing of the blade during flight may be governed or guided, a gimbal type of mounting is here utilized.

As shown most clearly in Figures 3 and 4, the gimbal mounting includes a pair of gimbal rings 46 and 47 which are tiltably secured to one another at diametrically opposed points by means of pins 48 and 49, the pin 49 having an extension outwardly of the assembly which is enlarged and provided with a curvate surface as at 50. Preferably, the pins 48 and 49 have a threaded portion engaging in the gimbal ring 47 with the outer portion thereof engaging suitable bushings 51 in the ring 46 to afford free tilting action between the rings.

The gimbal assembly above described is tiltably associated with the bearing assembly through the pins 52 and 53 (Figure 4), which are likewise diametrically opposed to one another and are disposed substantially normally with respect to the pins 48 and 49. The pins 52 and 53 are likewise provided with threaded portions embedded in the gimbal ring 47 and smooth portions which engage in bushings 54 in the enlarged portion 39 of the thrust shell 38 to afford free tilting movement between the gimbal assembly and the bearing assembly.

The propeller blade proper is operatively associated with the gimbal ring assembly in the following manner. A blade locating shell 55 of larger dimension than the thrust shell 38 is superimposed over the outer face of the latter. The shell 55 is provided at its marginal edge with an outwardly radially disposed flange 56 having a skirt 57 depending therefrom and is further provided at its crown portion with a slot 58 adapted to receive the section 21a of the blade pin 21.

As will be seen from Figure 3, the blade is provided with clamping pieces 23 having an enlarged root 23a which provides an annular recess between the inner wall thereof and the outer surface of the portion 21a of the blade pin 21. As will be seen clearly from Figure 2, the outer surface of the crown of the shell 55 surrounding the slot 58 is configurated to provide a serrated area as at 55a. A boss 59 having a substantially centrally disposed upstanding wall 59a adapted to surround the blade pin has radially extending flange portions 59b, the lower portions of which are similarly serrated to engage with the serrations of the shell 55. Thus it will be seen that upon engagement of the nuts 41 and 44 with the root end of the blade pin the propeller blade proper is securely and immovably mounted upon the shell 55. To the end that the shell 55 together with the associated propeller blade may be attached to the gimbal assembly for movement therewith through a tilting motion and for rotation relative thereto, a plurality of rollers 60 are suitably secured beneath the flange 56 of the shell 55 and against the skirt 57 thereof.

From the foregoing it will be seen that the propeller blade is so mounted relative to the sleeve 28, annulus 29 and thrust shell 38 that it may, together with the boss 59, the shell 55 and the nuts 41 and 44, tilt about the gimbal pins 48, 49, 52 and 53, this action being aided by the ball bearing system 45 and the entire movement of the above parts being relative to the thrust bearing shell 38, the sleeve 28 and the propeller shaft 26. Furthermore, it will be seen that through the rollers 60, those parts above mentioned as being associated with the propeller blade, may also be rotated relative to the sleeve 28, annulus 29 and thrust bearing 38, this rotative movement being also relative to the gimbal assembly since the rollers 60 permit rotation of the shell 55 and its associated members about and upon the gimbal ring 46.

Relative movement between the propeller blade and its respective parts and the sleeve 28 and annulus 29, which are non-adjustably mounted upon the propeller shaft, being provided for as above set forth, the structure which affords pre-flight adjustments of the blade and its associated parts relative to the propeller shaft and its associated parts will now be explained.

As shown clearly in Figure 3, the annular recess provided by the enlargement 23a of the clamping assembly 23 is of larger diameter than the outer surface of the wall 59a of the boss 59. The inner wall of the recess and the outer surface of the wall 59a are also serrated as at 23b and 59c to provide for the insertion of a double serrated ring 61 which, when disposed in the position shown in Figure 3, prevents relative twisting motion between the propeller blade, the boss 59 and the blade locating shell 55. The serrations on opposed surfaces of the ring 61 are so disposed that a vernier effect may be obtained.

From the foregoing, it will be seen that prior to flight, the nuts 44 and 41 may be loosened or removed from the threaded root end of the blade pin 21, whereupon the blade pins together with the portion 23 of the blade may be raised relative to the shells 38 and 55 to disengage not only the serrated engagement between the portion 23 of the blade, the ring 61 and the wall 59a of the boss 59, but also the serrations 55a of the shell 55 and the serrations on the under surface of the flange 59b of the flange 59. When these various serrations are disengaged it will be understood that the blade may be rotated relative to the shell 55 and the slot 58 therein and furthermore, may be tilted relative to the radial axis of the shell 55 passing through the pivot point X, the center of the hemispherical bearing 38. A manifestation of this latter tilting adjustment may be seen in Figure 3 as represented by the chain lines Y and Z. The line Y represents the radial axis of the shell 55 and the roller bearing 60 coinciding in the position shown in Fig. 3 with the axis of symmetry of the shell 38 and the rotating and tilting adjustment of the blade, independent of any tilting action obtained through the gimbal assembly is represented by the angle D between axis Y and the longitudinal centroid Z of the propeller blade which is substantially represented by the axis of the blade bolt 21.

As shown most clearly in Figures 1 and 3, an annular plate 62 is mounted rotatably upon the sleeve 28 and is provided with spiral cut-outs 63 of predetermined configuration for receiving the enlarged curvate end of the gimbal pin 49. From Figure 1 the arrangement providing for two propeller blades will be clearly understood, the lower slot 63 shown therein being adapted to accommodate the respective pin 49 of the blade opposed to that shown at 20. It is deemed unnecessary that the duplicate structure opposed to that here described be set forth in detail.

It will be understood that except as provided presently, the annular plate 62, though rotatable, normally remains stationary relative to the sleeve 28.

As shown clearly in Figure 3, a bushing 64 is adapted to ride in the respective slot 63 and this bushing is inwardly configurated to receive the enlarged head 50 of the pin 49.

To the end that the relative tilted position between the shell 38 and the gimbal assembly may be adjusted prior to flight, movement limiting means between the shell 38 and the annulus 29 is provided. This limiting means includes a flange 29a which may be formed integrally with the annulus 29 at the lower end of the threaded portion thereof, this flange being provided with unevenly spaced apertures 29b as shown in Figure 6. Likewise, the adjacent section of the under surface of the enlarged portion 39 of the shell 38 is also provided with unevenly spaced apertures shown in full lines in Figure 6 as 39a. The apertures 39a are threaded to receive the threads of a suitable stud 65 which may be removed to permit relative rotation between the annulus 29 and the portion 39 of the shell 38 until the desired apertures 39b and 39a coincide, whereupon the stud 65 may be again inserted to retain the adjusted position.

It will be seen that actually two adjustments are obtained by the relative rotation of the shell 38 about the tube 29. First, the distance between the center line of the propeller shaft 26 and the point X of Figure 3 is varied due to the threaded engagement between the adjustable parts. Second, this displacement of the pins 48 and 49 turns the axis defined by the center lines of the pins 48 and 49 about an angle corresponding to the above named relative rotation so that the shell 55 with its respective blade is freely tiltable about that axis.

From the foregoing, it will be seen that so far as pre-flight adjustments are concerned, four adjusting movements may be accomplished by the mechanic.

First, the blade angle A between the mean chord N of the propeller blade and the long median M of the slot 58 as viewed in Fig. 4 may be adjusted through disengagement of the serrated ring 61 thereby to afford relative rotation between the blade and the shell 55. This characterisation of the blade angle A as an angle being enclosed between the long median M of aperture 58 and a mean chord of the blade signifies the structure only; the underlying principle is substantiated by the angle between the plane of angle D which is defined shortly afterwards and the blade chord, the longitudinal median M of the aperture 58 representing the plane of angle D.

Second, the cone angle D between the longitudinal axis Z of the blade bolt 21 and the axis of the roller bearing 60 between the lines Y and Z of Figure 3, may be varied by disengagement of the serrations 55a with those of the boss 59.

Third, the pin angle B between the center line T of the pins 48 and 49 of gimbal ring 46 and the center line of the engine shaft lying in the plane as viewed in Figure 4 is accomplished through removal of the stud 65 and the re-arrangement of the vernier arrangement of the apertures 29b and 39a in the tube 29 and the enlarged portion 39 of the shell 38, respectively.

Fourth, the tilt angle C between the center line T of the pins 48 and 49 and the center line in the engine shaft representing relative tilt between the gimbal assembly about the center line S of the pins 52 and 53 of fixable gimbal ring 47 relative to the propeller shaft P as viewed in Figure 3 by a rotary adjustment of the disc 62 and its spiral slot 63 causing movement of the head 50 of the pin 49 through the respective slot 63.

Further, the distance between the point X and the center line of the engine shaft resulting from the threaded engagement between the shell 38 and the annulus 29, the adjustment of the above mentioned distance between the center of the spherical bearing and the center line of the engine shaft resulting from the movement of the shell 38 upwardly or downwardly relative to the annulus 39 as viewed in Figure 3, when the adjustment is made by removal of the stud 65.

Given the mathematical statements:

$$D.\sin(A-B-\phi_1) = f_1.\cos(B) - g_1.\sin(B) - C$$
$$D.\sin(A-B-\phi_2) = f_2.\cos(B) - g_2.\sin(B) - C$$
$$D.\sin(A-B-\phi_3) = f_3.\cos(B) - g_3.\sin(B) - C$$
$$D.\sin(A-B-\phi_4) = f_4.\cos(B) - g_4.\sin(B) - C$$

which is fully set forth and explained in my co-pending application for patent filed October 5, 1940, United States Serial No. 359,923, except that the distance C was there assumed to be zero, wherein D had been called the ideal crank length measured by the distance between the inter-section points of the axes Y and Z on the inner surface of the shell 38. A represents the blade angle between the ideal crank D and a blade chord N chosen as representative, B represents the pin angle between the center line T of the pins 48 and 49 and longitudinal axis P of the engine shaft, C represents the fixed tilt angle which the same center line encloses with a plane perpendicular to the radial axis of the shell 38, φ represents the pitch angle of the blade that is the angle between the above named representative blade chord and the plane of rotation of the propeller, f represents the distance from the plane of rotation perpendicular to the engine shaft to a point on the center line of the blade bolt 21 where it crosses the inner surface of the shell 38, and g represents the distance from the above point on the center line of the blade bolt to a plane containing the engine shaft and the radial axis of symmetry of the shell 38. The values of f and g also depend partly on the distance between the center line of the engine shaft and the center X of the spherical bearing.

By computation based upon the above formulae, the principal pre-flight adjustments, f, A, B and C may be computed quantitatively to accommodate four different states of flight, for instance, take off, climbing, top speed and cruising. The various factors of the formulae having been computed quantitatively and provided for structurally by the adjustments above set forth, the various states of flight will have by virtue of the equilibrium of the self-balancing mechanism just those values of centrifugal force, depending upon the number of revolutions per minute, engine torque depending upon the manipulation of the gas and pre-compresser throttle, and propeller thrust depending upon the velocity of flight, which are expected either from aerodynamic computations or former flight tests. In the above formulae the quantities, f, g and φ represent the various states of flight, for example, four states in the present instance, whereas the quantities D, A, B and C represent the pre-flight adjustments which remain the same throughout each state of flight unless manual adjustment changes herein provided for are made during flight, for instance, for backward thrust.

As will become apparent presently, the adjustments provided for above afford subsequent automatic self-balancing movements of the propeller blade to provide for constant but possibly different propeller speed for each state of flight, and, furthermore, the bearing assembly is so constructed and arranged as to provide for automatic self-balancing movement of the propeller blade into a feathering position in case of engine stoppage or in the case of a dive without or with very little power.

It will be understood that the adjustments above set forth once made may be retained so long as the characteristic sets of torque, thrust and centrifugal force for the four states of flight are maintained the same for the particular craft upon which the assembly is mounted. In the event of a change in the power plant to a higher or lower horsepower, or in the event of the change of the airplane dimensions, the adjustments for the various states of flight of course will have to be different, and must again be computed in accordance with the above formulae, as previously explained.

Assuming now that the various pre-flight adjustments have been calculated and have been provided for through manipulation of the mounting assembly, as above described, the assembly is in readiness for flight during which automatic self-balancing movements of the blades will manifest themselves in accordance with variations of thrust, torque and centrifugal force corresponding to the different states of flight.

These automatic movements are in effect self-balancing movements of the propeller blade brought about easily and freely through forces imposed thereon due to changes in the above mentioned factors during flight and these movements occur, not as the result of the application of outside forces to the blades to create movement thereof relative to the hub structure, but rather as the result of the change of the forces which have previously maintained the blades in a given adjusted position.

The self-balancing movements of the blades which occur during flight are afforded by rotation of the propeller blade relative to the engine shaft through movement of the shell 55, the blade and their associated connecting members upon the rollers 60, the coincident shifting of the center line of the propeller blade through a path prescribing a cone having its apex at the point X, the center of the spherical bearing shown in Figure 3, and the tilting of the propeller blade and of the shell 55 with their associated connecting parts in the gimbal system through tilting of the gimbal ring 46 about the pins 48 and 49, this latter movement in effect causing a shifting of the locus or axis of the conical path prescribed by the center line of the propeller blade through rotative movements upon the roller bearing 60.

Thus it will be seen that the propeller blades, after the initial pre-flight adjustments have been made, are subjected to self-balancing movements through a path described as the result of variations in centrifugal force as determined in the following manner by the R. P. M. of the propeller, engine torque as determined by manipulation of the throttle, and propeller thrust as determined by the velocity of flight, this path being in effect characterized by the surface of a cone having its apex at the point X as seen in Figure 3, and further, the locus or axis of this cone tilting freely about the axis of the pins 48, 49 which may be pretilted into a fixed position about the axis of the pins 52, 53 of the gimbal system.

Due to the self-balancing movements the forward motion of the blades under the influence of changes in flying conditions manifested by centrifugal forces, thrust and torque results in a decrease in blade pitch angle while rearward swinging self-balancing movement of the blades results in an increase of the blade pitch angle; it also acts as a damping agent against periodic exciting forces of the air inflow or the engine torque because in disturbed forward tilting the pitch and therefore the thrust decreases and the centrifugal force has a stronger restraining influence and vice versa for rearward tilting. A similar action also occurs in sideways tilting through the plane of rotation.

To the end that the centrifugal and aerodynamic couples acting about the median axis of a blade of the above described system may be intercepted and flutter which might arise in the blades may be absorbed and dampened, there is provided upon the flange 56 of the shell 55, as shown best in Figures 1 and 2, diametrically opposed, universally mounted pendulums 66 which may for example weigh about one pound each. The pendulums 66 are suitably, adjustably mounted upon arms 67 and held thereon by means of nuts 68, the arms 67 terminating at their remote ends in yokes 69 which are apertured to receive a pin 70 which also extends through pivoted uprights 71 swivelly mounted to the flange 56 in any suitable manner.

As a further pre-flight adjustment the mass of the counter-weights 66 and their distance from the engine shaft can be changed by means of the threaded rod 67 and the nut 68. Originally these counter-weights are intended to relieve the self-balancing mechanism described above entirely from any strain produced by the centrifugal and aerodynamic couples, but if a small amount of strain is allowed, then a certain percentage of these couples can be utilized to provide an adjustment for a further flight condition.

The action of these pendulums, during flight, is best shown in Figure 1. Due to the centrifugal forces evolved during rotation of the propeller shaft and the bearing mountings for the blade, the pendulums assume an extended position shown in dotted lines in Figure 1, and pass through compensating movements whereby the reacting movements thereof about the pins 70 and the upright 71 will oppose the development of flutter or vibrations of the respective blades and its associated shells.

The pre-flight adjustment for four or eventually further states of flight as explained above will in many cases be sufficient without any further mechanism, but there are additional requirements for which an additional mechanism will be needed.

These additional requirements are: exact adjustment during flight for varying weight (fuel consumption and the change of passengers or freight), great changes of altitude, change of fuel, synchronization of engines, and propellers on multi-engined airplanes, starting the propeller out of a feathering position by going into a windmilling position and changing pitch for going into reverse thrust and going into normal thrust again.

This additional mechanism using one of the pre-flight adjustments for additional adjusting during flight is designed to lift or lower the pin 49 of the gimbal ring system 46 and 47 by means of a differential mechanism subject to either manual operation or from a governor located on the engine. A differential mechanism has been found preferable to a rotating and gliding sleeve mechanism on account of the saving of space.

The differential mechanism permits fine and self-locking adjustment of the annular plate 62 by a relative movement thereof with respect to the sleeve 28 whereby the gimbal assembly as above stated is adjusted to any degree of exactness.

The differential assembly includes a bracket ring 72 mounted rotatably on the sleeve 28. The bracket 72 includes a horizontal portion 73a which is provided with worm teeth 74 and a perpendicularly extending portion 73b which is apertured to receive a ball bearing 75 in which is mounted a shaft 76 having a pinion 77 fixedly secured thereto. The forward end of the shaft 76 being mounted in a ball bearing 78 suitably mounted on a forward extension 79 of the bracket 72. The inner face of the horizontal portion 73a of the bracket 72 is constructed with a recess to receive roller bearings 80 which provide for free rotation of the sleeve 28 relative thereto.

The pinion 77 is of step formation providing two sets of teeth, the rear set being of less diameter as shown at 81 and engaging a pinion 82 mounted upon a shaft 83 which is secured in the extension 79 of the bracket 72, the pinion 82 in turn, meshing with gear teeth 82a formed around the outer surface of the sleeve 28, while the step of the pinion 77 having the larger diameter engage teeth 85, internal gear teeth 85 of a housing 86 suitably secured to the outer peripheral edge of the annular plate 62 (which may be made in two pieces to facilitate assembly).

From the foregoing, it will be seen that the bracket 72 remains stationary relative to the engine housing 73 during the revolutions of the propeller shaft as long as the worm 87 acting on teeth 74 is not operated, while the annular plate 62 and its associated housing 86 moves therewith with the result that the teeth 82a on the sleeve 28 and the teeth 85 on the housing 86 ride over and rotate the pinions 77 and 82.

To the end, however, that relative adjustments between the annular plate 62 and the sleeve 28 and thus between the plate 62 and the pin 49 may be obtained, the manually or electrically rotatable worm 87 is provided for engaging the worm teeth 74 upon the horizontal portion 73a of the bracket 72. This worm is suitably mounted for rotation on some part of the plane or engine housing and it will be understood that rotation thereof imparts differential action to the pinions with the result that relative movement is provided between the sleeve 28 and the annular plate 62. Under these circumstances, relative movement of the head of pin 49 in the perspective spiral slot 62 is obtained with the result that a fine adjustment through tilting of the gimbal assembly about pins 52 and 53 is obtained thus further shifting the conical path traversed by the center line of the blade through its automatic self-balancing movements, as existing conditions require.

The advantage of this novel combination of a differential gear with one of the pre-flight adjustments, over my co-pending application S. N. 359,923, consists as well in the self-locking property right at point of attack at the gimbal pin, as also in the fact that any not entirely intercepted centrifugal or aerodynamic couples of the blade are taken by the two other pins 52 and 53 and not by the flight adjustment pin 49, 50 as a comparison with my co-pending application shows.

From the foregoing, it will be seen that there is provided herein a novel mechanism which more efficiently affords the elimination of bending moments at the root of the blade as the latter passes through automatic, self-balancing adjustment movements during flight.

Another advantage of the novel mechanism described above is that while provision is made for delicate pre-flight adjustments to accommodate an increased number of states of flight, and to provide for free self-balancing of the propeller blade during flight, the mechanism affording such adjustments and such self-balancing movements can be made very light because the excessive strains of centrifugal force do not pass through it but are alone taken by the rugged construction including the nut 41 and the shell 38.

Still another advantage of the novel mechanism described above, is the provision of inertia members 66 so constructed and arranged that their reaction effectively absorbs or dampens the natural tendency of the blades to flutter or vibrate during their self-balancing movements during flight.

Figure 8:
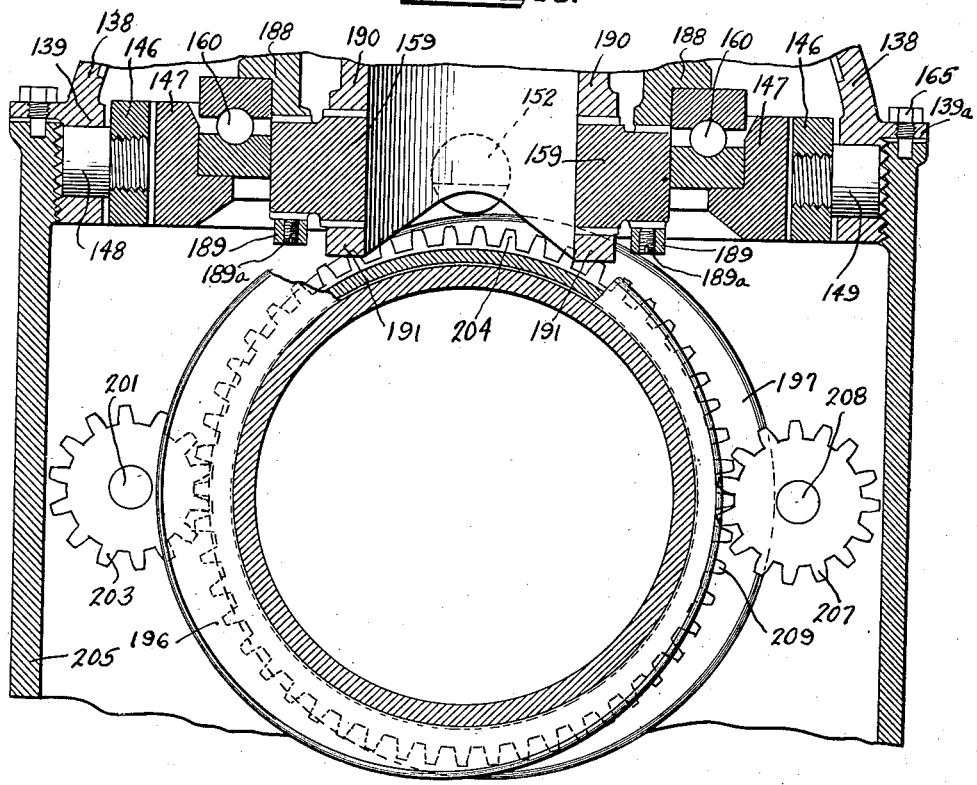
Figure 8 is a fragmentary cross-sectional view through a plane normal to the axis of the propeller shaft, of the modification shown in Figure 7, the section being taken along the line VIII—VIII of Figure 7 so far as the latter figure extends.
Figure 9:
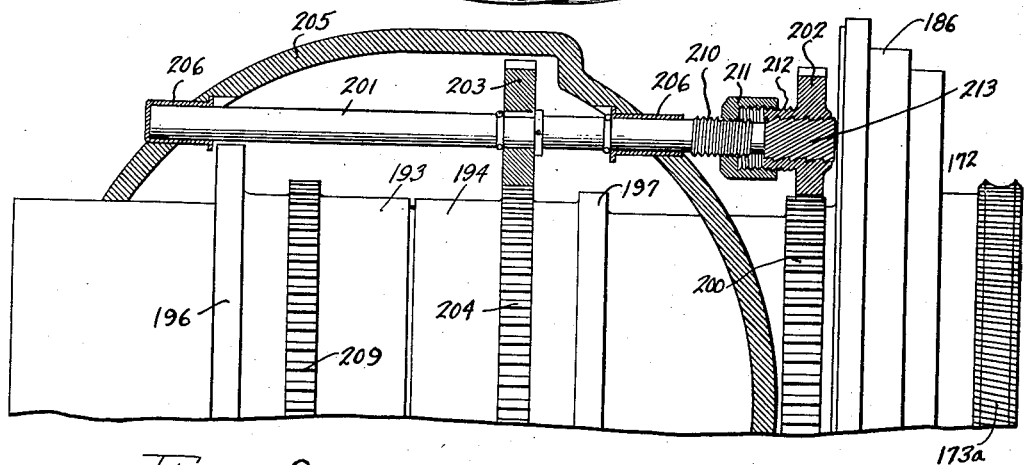
Figure 9 is a cross-sectional view showing the details of an adjustment operable either during preflight or during flight shown in Figure 8.

In the modified construction shown in Figures 7, 8 and 9, the principles of operation described above also apply. However, in the modified form the gimbal assembly including gimbal rings 146 and 147 is housed within the shell 138 instead of outside thereof, and the change in blade pitch is accomplished by rotation about the ball bearing assembly 160 instead of the roller bearing 60.

In this construction the propeller blade assembly 123 is secured to the shell 155 which rides over the outer surface of the shell 138 through a flange connection 159c functioning similarly to that of 59c in Figure 3.

In the modification the shell 155 is provided with an upstanding annular wall 159a disposed substantially at the crown thereof, this wall being double splined to engage spline 161 located on the inner surface at the lower end of portion 123a of the propeller assembly and the spline 159c formed in the surface of the blade shaft 121. The foregoing construction serves the purpose of the spline connection at the base of the propeller assembly 23 of Figure 3.

In the construction shown in Figure 7, the shell 155 which moves with the propeller blade 120 throughout its automatic adjusting movements rides on the outer surface of shell 138 in which a circular aperture 140 the same as the aperture 40 shown in shell 38 in Figure 3 is located. The shell 138 in this construction also, is provided with a marginal portion 139 threaded to annulus 129 suitably welded to the sleeve 128. The shell 138 is provided, immediately above the threads on its outer marginal periphery, with a flange 139a, which is provided with the unequally spaced apertures similar to those shown in Figure 6. The annulus 129 is likewise provided with unequally spaced apertures in its upper surface and thus the vernier effect described previously is likewise here obtained. Suitable studs 165 are provided for threaded engagement with the apertures in the flange 139a whereby shell 138 after its adjustment by rotation is secured in its position with respect to the propeller shaft.

In the construction of Figure 7 there is also provided a nut 141 which is configurated to conform to the inner surface of the shell 138, there being a ball bearing system 145 provided between the nut and the shell 138. In this construction, the inner surface of the shell 138 and the upper surface of the nut 141 are likewise lined with hard steel as at 138a and 141a.

In this modified form the nut 141 is not screwed to the bolt 121 but is slipped over this bolt from the outside and carried by a flange on the enlarged portion 144 integral with the bolt 121. Thus, as in the case of the form first described, the centrifugal forces developed are borne by the annulus 129, the shell 138 and the nut 141, and the remainder of the mechanism is thereby protected from all stresses imposed during rotation of the propeller.

From the foregoing, it will be seen that again provision has been made for rotation of the propeller blade proper relative to its mounting assembly through a pre-flight adjustment and again the rotation of the gimbal pins 148 and 149 is provided for a pre-flight adjustment by the threaded engagement of the annulus 129 with the shell 138, this latter adjustment being calibrated with a vernier also.

A further difference in the modified form of Figure 7 is the replacement of the serrated slot 58 by two serrated transverse studs 159 the serrations of which afford a vernier assembly and which connect the bolt 121 to the ball bearing races 160, thereby to provide adjustment of the angle between the axes Y and Z in Figure 7 for the same purpose as in Figure 3.

As previously stated, the gimbal system in the construction shown in Figures 7 and 8, includes gimbal rings 146 and 147, the former being suitably secured to the enlarged portion 139 of shell 138 by means of diametrically opposed pins 148, having a portion thereof threaded into the ring and an outer portion rotatably embedded in the shell. The rings 146 and 147 are tiltably secured to one another to complete the gimbal system by means of diametrically opposed pins 152 and 153 which are disposed at substantially right angles to pins 148 and 149. The ring 147 (see Figure 8) and the inner ends of pins 152 and 153 (see Figure 7) are cut away to provide a seat for the ball bearing assembly 160 upon the upper race of which is mounted a journal member 188 having a recessed lower central portion forming depending legs 189 as seen in Figure 7. The legs 189 are provided with apertures having serrations therein constructed and arranged to enmesh with the serrations of the studs 159, and as will be clearly seen from Figure 8, the studs 159 are provided with a reduced outer portion which fits into the apertures and may be secured therein by means of set screws 189a. A mounting member 190, having legs 191 apertured and serrated to receive the inner enlarged portions of the serrated studs 159, is disposed within the journal member 188 and is secured thereto through the medium of the serrated studs 159, as shown clearly in Figure 8.

From the foregoing, it will be seen that by loosening the set screws 189a and sliding the studs 159 inwardly, as viewed in Figure 8, the members 188 and 190 may be moved through a tilting adjustment relative to one another, whereby the studs may be re-inserted and because of the serrations therein this adjusted relationship is securely maintained. Since the propeller blade is securely attached to the member 190, and since the member 188 rides upon the upper race of the ball bearing assembly 160, it will be seen that this tilting movement causes relative angular movements between the center line of the propeller blade and the axis similar to the axis Y shown in Figure 3. This being the case, it will be seen that the above described adjusting movement about the studs 159 is functionally similar to the adjustments between the member 59b and the serrations 55a shown in Figure 3.

From the foregoing, it will be seen that provision has been made for pre-adjusting the blade angle relative to its mounting structure (the axis of the studs 159) and provision has also been made for pre-adjusting the relative position of the blade bolt with respect to the axis of the ball bearing 160, the latter being accomplished through manipulation of the stud 159. The pre-flight tilting adjustment of the gimbal assembly which includes rings 146 and 147 is accomplished in the structure shown in Figures 7 and 8 through the medium of cam members 193 and 194 which constitute sleeves adapted to be fitted over the sleeve 128.

It is to be noted with respect to both forms of the invention, that the gimbal rings as shown in Figures 1 and 7 are so disposed that their axes coincide, and they also coincide with the axis of symmetry of the spherical bearing. It will be understood, of course, that pre-flight adjustments will eliminate this coincidence.

The cam members 193 and 194 each are provided with an integrally formed cam ring 196 and 197, respectively, each of which bears against the lower surface of the gimbal ring pins 152 and 153 at diametrically opposed points.

As will be seen most clearly from Figure 9, the eccentricities of the respective cams 196 and 197 are arranged on opposite sides. Consequently, as the cams engage the lower surface of gimbal pins 152 and 153, as shown in Figure 7, and are rotated relative to the sleeve 128, a tilting action to the right or to the left, as seen in Figure 7, will result, depending upon the adjustment desired. This tilting movement of the gimbal ring 147 about pins 148 and 149 results in like tilting action of the associated parts which includes the ball bearing assembly 160, the journal member 188, together with the member 190 through the serrated stud 159, and lastly, the propeller blade through the bolt portion 121.

As in the case of the construction disclosed in Figures 1 to 6, inclusive, the modified apparatus includes a differential mechanism by which the pilot may obtain refining adjustments of the mechanism during flight. The various parts of the differential mechanism which are the same as those of the construction shown in Figure 3, are similarly identified in the hundred series. Instead of the annular plate 62, the differential housing 186 supports the upper end of an annular member 198 having a forwardly extending flange 199 which rotatably surrounds the surface of the sleeve 128 and is provided with gear teeth 200.

As will be seen more clearly from Figure 9, the operative connection between the differential mechanism and the respective sleeve 194 includes a shaft 201, having a pinion 202 mounted at one end thereof, and engaging the teeth 200, and a second pinion 203 which is keyed thereto and engages with the teeth 204 of a circular gear on the sleeve 194. The shaft 201 is suitably retained in operative relationship in the assembly by means of bushings 206 which are suitably mounted in the housing 205 which extends between the faces of the various propeller blades.

As in the case of the previous construction, a mechanism similar to that disclosed in the drawings is provided for each of the blades and, in the present instance, as shown in Figure 8, a pinion 207 is mounted on a shaft 208 enmeshed with the gear teeth 209 of the sleeve 103 thereby to control the cam 196.

In the event that the cams become slack so that coincident engagement of their surfaces with the respective points on the respective gimbal rings 107 is not obtained, and further to provide a pre-stressing between the ball bearing 160 and the spherical ball bearing 145, a re-adjustment may be made through manipulation of the pinions 202 or 207 with respect to the shafts 201 and 208, respectively. This adjustment may be accomplished by means of the mechanism shown clearly in Figure 9. The operative end of the shaft 201 is threaded as at 210 to receive a cup nut 211, which is internally threaded to receive a threaded extension 212 of the pinion 202. The extreme end of the shaft 201 is enlarged and provided with threads of very high pitch angle and the pinion 202 is likewise threaded to be received by this enlarged end of the shaft as at 213, consequently, when the cup nut 211 is rotated relative thereto and, due to the threads on the enlarged portion 213 of the shaft, this pinion is rotated to provide relative movement of the shaft 201 and the pinion 203 for adjusting the respective cam 197 against the cam 196 which is held in position by gear 209 which enmeshes by means of shaft 208 and a companion gear to gear 202, with gear 200. It is to be understood that the turn buckle assembly need not be incorporated in the companion gear to gear 202.

A construction whereby adjustments of the above character and for the same purposes, may be applied to a plurality of propeller blades, includes sleeves similar to those shown at 193 and 194 of Figure 9, which extend around a portion of the propeller shaft and are formed of several pieces which are of sector form which affords relative movement of the pieces around the shaft. It will be seen that because of the possibilities of independent movement of the sector pieces together with their respective cams and operating gears, that independent pre-stressing forces may be applied to the individual propeller blades. In such a proposed construction there will of course be provided gears similar to those shown at 203 and 207 and respective turn buckle assemblies such as that shown in Figure 9, whereby the various sectors may be operated independently of each other and similarly to the operation of the sleeves 193 and 194 shown in Figure 9.

It will be understood that the above mechanism is likewise operable to impart similar adjustments to like parts of companion propeller blades.

From the foregoing, it will be seen that the forward inclination of gimbal rings by means of pins 49 of Figure 3 or 153 of Figure 7, would force the respective blades forward if centrifugal forces were not acting, but centrifugal force pulls back and forces the blade to turn on roller bearing 60 of Figure 3, or ball bearing 160 of Figure 7, into higher pitch, and vice versa, for rearward inclination into lower pitch.

If the rearward inclination of the gimbal rings, that is, the downward inclination of pins 49 or 153, respectively, is sufficient, then the pitch becomes so low that rearward thrust is produced. The necessary inclination decreases with speed of the airplane but is very small even for zero speed.

The feathering position of the blade establishes itself when the centrifugal force and the torque disappear as in a gliding flight because the only aerodynamic force on the blade then is the air resistance, this force pushing back the blade and turning it at the same time on the roller bearing 60 in Figure 1 or on the ball bearing 160 in Figure 7, to steeper pitch until the windmill torque on the blade has disappeared. No stop is necessary to keep the blade in this free feathering position of the blade.

To start the engine and propeller in a gliding flight by aerodynamic forces alone, after the foregoing feathering position has been attained, a suitable movable stop lever may be fastened to the discs 62 or 86 in Figure 3, and 198 or 186 in Figure 7. Such a stop lever would attain the purpose by pushing against the trailing edge of the blade by means of the differential gear started by the pilot to bring the blade against the air resistance into such a positive pitch that it starts the engine by its windmotor or windmill action.

The nature of fastening such a stop lever on the disc 62 or 198, its form and length must, of course, satisfy the condition that the angular position of the differential gear at the moment of starting must also correspond to the blade pitch desired for running of the propeller after being started.

The improvements shown herein are for illustrative purposes, and may be changed or modified without departing from the spirit and scope of the invention as set forth in the appended claims, it being understood that the principles described and claimed herein are well adapted for use with autogyros or helicopters.

I claim as my invention:

1. A variable pitch propeller comprising a blade mounting structure associated with the root of the propeller blade to secure the blade on the propeller shaft, a blade locating member, a gimbal system composed of a freely swivelling ring and a fixable ring adapted to support the said blade locating member on said mounting structure for rotary movement about the radial axis of the freely swivelling ring and for universal adjustment relative to the propeller shaft, means associated with said gimbal system to position the blade locating member at a predeterminably fixed angle about the tilting axis of the fixable gimbal ring, means to position the blade root at a predeterminable angle relative to the radial axis of the freely swivelling gimbal ring, means affording a free tilting movement of said blade locating member about the tilting axis of the freely swivelling gimbal ring, an elongated aperture in the blade locating member to receive the root of the blade having a longitudinal median intersecting the radial axis of the freely swivelling gimbal ring, and means to releasably secure the blade on the blade root at a predeterminable angle relative to the long median of said elongated aperture.

2. A variable pitch propeller comprising a blade mounting structure associated with the root of the propeller blade to secure the blade on the propeller shaft, a blade locating member, a gimbal system composed of two concentric tiltable rings, one being a freely swivelling outer ring and the other a fixable inner ring, antifriction rollers between said blade locating member and said outer ring, the said gimbal system and said antifriction rollers adapted to support said blade locating member on said mounting aperture for rotary movement about the radial axis of the freely swivelling outer ring and for universal adjustment relative to the propeller shaft, means associated with said gimbal system to position the blade locating member at a predeterminably fixed angle about the tilting axis of the fixable inner gimbal ring, means to releasably position the longitudinal axis of the blade at a predeterminable angle relative to the radial axis of the free swivelling outer gimbal ring, means affording free tilting movement of said blade locating member about the tilting axis of the outer free swivelling ring, means to position the blade locating member at an adjustable angle between the tilting axis of the outer gimbal ring and the propeller shaft axis an elongated aperture in the blade locating member to receive the root of the blade, said aperture having a longitudinal median, intersecting the radial axis of the freely swivelling outer gimbal ring, and means to releasably position the blade on the blade root at a predeterminable blade angle relative to the long median of said elongated aperture.

3. A variable pitch propeller comprising a mounting structure associated with the root of the propeller blade to secure the blade on the propeller shaft, said structure including a tubular member rigidly mounted on the shaft being provided with a thread at its outer surface and a semispherical thrust shell provided with a marginal portion threaded at its inner face for engagement with the thread of said tubular member, an aperture in the crown of said shell for insertion of the blade root, a gimbal system encircling the marginal portion of said thrust shell and pivotally supported therein by means of pivot pins, said gimbal system composed of a pair of concentric rings pivoted together by pins at points substantially normal to the pivot connection of the gimbal system with the thrust shell, a blade locating semispherical shell having an elongated aperture at the crown and a laterally extending flange at the peripheral edge thereof, said shell being disposed to overlie said thrust shell in a universally movable relationship and being provided with serrations, said flange overlying the gimbal system and being constructed and arranged to retain bearing members on the surface thereof to allow rotation of said blade locating shell relative to said gimbal system, a pin at the end of the root of said propeller blade, said pin having a diameter substantially less than the aperture in said thrust shell and substantially equal to the width of said elongated aperture, a nut threadably secured to the end of said blade pin, said nut being constructed and arranged to conform to the semispherical configuration of the inner surface of said thrust shell, a blade supporting member embracing the said blade pin, said embracing member having serrations thereon to mesh with the serrations of the blade locating shell and being disengageable therefrom for adjustment when the said nut is unscrewed from the root of said blade pin, a clamping member for the said blade pin encircling said blade supporting member, said clamping member and said blade supporting member having a serrated engagement and being releasable upon unscrewing of said nut to afford an adjustment of the angle between a mean chord of the blade and the long median of the elongated aperture.

4. A variable pitch propeller comprising a mounting structure associated with the root of the propeller blade to secure the blade on the propeller shaft, said structure including a part spherical thrust shell having a releasable rotatable and radially adjustable connection with the propeller shaft and an aperture in its crown section for the insertion of the root of the propeller blade, said connection extending radially to the propeller shaft, means to releasably lock said thrust shell of the shaft against rotation about its axis of symmetry, the latter being normal to the propeller shaft axis, a gimbal system composed of a pair of concentric gimbal rings tiltably secured to one another by diametrically opposed pivot pins and tiltably connected with said thrust shell by pivot pins extending through an axis disposed substantially normal to the axis of said first named pivot pins, a part spherical blade locating shell encircling the thrust shell, said blade locating shell having an elongated aperture in the crown thereof and having a pherical edge supported on said gimbal system by antifriction rollers to afford relative movement between said blade locating shell and said blade mounting structure, a pin at the root of said propeller blade, said pin having a diameter substantially less than the aperture in said thrust shell and substantially equal to the width of the aperture in said blade locating shell and having threads at its surface for receiving a nut to hold said blade in operative association with said blade mounting structure, means for tilting said gimbal system through an angle lying in a plane substantially perpendicular to the axis of the propeller shaft and containing the radial axis of the said thrust shell, means to releasably secure the blade at a predetermined angle between the mean chord of the blade and the long median of the elongated aperture of said blade locating shell, and means to releasably secure said blade pin at a predetermined angle between its longitudinal axis and the radial axis of symmetry of the blade locating shell.

5. A variable pitch propeller comprising a blade mounting structure to secure the blade on the propeller shaft, blade supporting means movably associated with said mounting structure, said blade supporting means including a substantially part-spherical blade locating member having an elongated aperture in the crown section thereof, tiltable means to support said member for universal adjustment relative to said mounting structure and to the propeller shaft, means to releasably secure the blade at a predeterminable blade angle relative to the longitudinal median of said aperture, means for releasably securing the blade with its longitudinal axis at a predeterminable angle relative to the radial axis of said blade locating member, means for releasably securing said blade locating member and the blade at a predeterminable fixed tilting angle lying in a plane substantially perpendicular to the axis of the propeller shaft and containing the radial axis of the blade mounting structure, means to afford a free tilting movement of said blade locating member through an angle lying in a plane substantially perpendicular to a plane through the axis of the propeller shaft containing the radial axis of the said blade mounting structure, and means to afford relative movement of said blade locating member and the blade relative to said mounting structure and said propeller shaft.

6. A variable pitch propeller comprising a mounting structure for mounting the propeller blade on the propeller shaft, means for adjustably securing said blade to said mounting structure including means for retaining said blade in operative association with said structure against the centrifugal forces developed during rotation of the shaft, tiltable blade controlling means to afford universal movement of the blade about a point eccentric of the center line of said shaft and rotational movement of the blade substantially about its longitudinal axis relative to said blade mounting structure, means for releasably securing said blade at a predeterminable blade angle and a predeterminable angle of its longitudinal axis relative to axes of said controlling means and independently of the rotational and universal movements of the said controlling means, and means for releasably securing said controlling means in a predeterminable angle of a transverse axis fixed on the mounting structure relative to the axis of the propeller shaft, and means to afford tiltable adjustment of said controlling means about an axis perpendicular of the radial axis of the mounting structure.

7. A variable pitch propeller comprising a mounting structure for mounting the propeller blade on the propeller shaft, means for adjustably securing said blade to said mounting structure including means for retaining said blade in operative association with said structure against the centrifugal forces developed during rotation of the shaft, a blade locating member and tiltable blade controlling means to afford universal movement of the blade about a point eccentric of the center line of said shaft and rotational movement of the blade substantially about its longitudinal axis, relative to said blade mounting structure, means for releasably securing said blade at a predeterminable blade angle and a predeterminable angle of its longitudinal axis relative to the tilting axes of said controlling means and independently of the rotational and universal movements of said controlling means.

8. A variable pitch propeller comprising a mounting structure for mounting the propeller blade on the propeller shaft, means for adjustably securing said blade to said mounting structure including means for retaining said blade in operative association with said structure against the centrifugal forces developed during rotation of the shaft, a blade locating member and tiltable blade controlling means to afford universal movement of the blade about a point eccentric of the center line of said shaft, and rotational movement of the blade substantially about its longitudinal axis, relative to said blade mounting structure, means for releasably securing said blade at a predeterminable blade angle and a predeterminable angle of its longitudinal axis relative to the tilting axes of said controlling means and independently of the rotational and universal movements of the said controlling means, and means responsive to the forces imposed by centrifugal force during operation of the propeller including weights disposed in diametrically opposed positions upon the blade locating member.

9. A variable pitch propeller comprising a mounting structure for mounting the propeller blade on the propeller shaft, means for adjustably securing said blade to said mounting structure including means for retaining said blade in operative association with said structure against the centrifugal forces developed during rotation of the shaft, a blade locating member and tiltable blade controlling means to afford universal movement of the blade about a point eccentric of the center line of said shaft, and rotational movement of the blade substantially about its longitudinal axis, relative to said blade mounting structure, means for releasably securing said blade at a predeterminable blade angle and a predeterminable angle of its longitudinal axis relative to the tilting axes of said controlling means and independently of the rotational and universal movements of the said controlling means, and means responsive to the forces imposed by centrifugal force during operation of the propeller including universally mounted weights disposed in diametrically opposed positions upon the blade locating member.

10. A variable pitch propeller comprising a mounting structure for mounting the propeller blade on the propeller shaft, means for adjustably securing said blade to said mounting structure including means for retaining said blade in operative association with said structure against the centrifugal forces developed during rotation of the shaft, a blade locating member and tiltable blade controlling means to afford universal movement of the blade about a point eccentric of the center line of said shaft, and rotational movement of the blade substantially about its longitudinal axis, relative to said blade mounting structure, means for releasably securing said blade at a predeterminable blade angle and a predeterminable angle of its longitudinal axis relative to the tilting axes of said controlling means and independently of the rotational and universal movements of the said controlling means, and a differential control mechanism mounted upon a part of the aircraft with which the variable pitch propeller mounting mechanism is associated and having geared connections between the propeller shaft and said differential control mechanism, said differential control being constructed and arranged to afford external controlled, relative movement between said differential control means and said shaft to further adjust the said tiltable controlling means of said mounting structure about an axis perpendicular of the radial axis of the mounting structure by relative movement between said shaft and the differential controlling mechanism.

11. A variable pitch propeller, a propeller shaft, blades mounted on said shaft for preflight adjusting location relative thereto and for adjusting movement relative thereto during flight, a structure including a thrust shell for so mounting each of the blades secured rotatably to the propeller shaft against the centrifugal forces developed during rotation of the shaft and the blades, a gimbal system composed of two concentric rings secured to said thrust shell by two diametrically opposed pairs of pins having their center disposed on the radial axis of the mounting structure and adapted for tilting movement of the gimbal system relative to said thrust shell, said pins tiltably connecting said thrust shell and the adjacent gimbal ring, connecting pins between the gimbal rings of said gimbal assembly having their centers disposed on the radial axis of the mounting structure, a blade locating shell secured with said thrust shell against separation therefrom due to centrifugal forces and for universal movement relative thereto and having its peripheral edge associated with the outer gimbal ring, an anti-friction bearing between said ring and the blade locating shell to afford rotation of the shell relative to the axis of the gimbal ring, carrying the blade locating shell, means associated with said gimbal system for adjustably tilting the same with said blade locating shell about said first named pins, and means in said blade locating shell for receiving the bolt of the respective blade in adjustable relationship to afford adjustment of a representative chord of the blade and of the longitudinal axis of the blade to vary the blade angle and the angle of tilt thereof relative to the radial axis of the anti-friction bearing.

12. A variable pitch propeller comprising a propeller shaft, blades mounted on said shaft for preflight adjusting location relative thereto and for adjusting movement relative thereto during flight, a structure including a thrust shell for so mounting each of the blades secured rotatably to the propeller shaft against the centrifugal forces developed during rotation of the shaft and the blades, a gimbal system composed of two tiltable concentric rings secured to said thrust shell by diametrically opposed pins having a common center disposed on the radial axis of the mounting structure and adapted for tilting movement of the gimbal system relative to said thrust shell, one pair of said pins tiltably connecting said thrust shell and the adjacent gimbal ring, a connecting pair of pins between the gimbal rings of said gimbal assembly having an axis containing the common center on the radial axis of the mounting structure, a blade locating shell, means for securing said blade locating shell with said thrust shell against separation therefrom due to centrifugal forces and for universal movement relative thereto, said member including an enlarged nut end of the bolt of the respective blade, an antifriction assembly mounted on said gimbal assembly to tilt therewith, a blade locating member secured for rotation with said antifriction assembly relative to said gimbal system, a serrated aperture in said blade locating member, a serrated member adapted to fit into said aperture to retain said blade in operative engagement with the gimbal system and the thrust shell to afford relative angular adjustment of the axis of said bolt relative to the axis of said antifriction assembly on one of the gimbal rings and a releasable serrated connection between said blade bolt and the respective propeller blade to afford adjustment of the angle between a representative chord of the blade and the axis of said serrated apertures.

13. A variable pitch propeller utilizing means for affording preflight adjustments of the propeller blades and means for affording self-balancing movements of the blades during flight, a gimbal system for mounting the root of the propeller blade on a propeller shaft mounting structure for adjusting movements relative thereto and means for releasably securing said gimbal system in a predeterminable angle about an axis substantially perpendicular to the axis of the propeller shaft including cam members revolvably mounted around the propeller shaft assembly and constructed and arranged to engage diametrically opposed parts of the gimbal system and means for adjusting said cam members relative to one another and relative to the propeller shaft assembly to releasably secure the gimbal system in a predetermined angle of tilt about an axis substantially perpendicular to the propeller shaft axis.

14. A variable pitch propeller comprising propeller blades and mounting structures for securing said blades to said shaft for preflight adjustments and for self-balancing movements relative to said mounting structure during flight including a gimbal system, a differential mechanism movable with said shaft mounting structure during rotation thereof and being movable relative thereto and including a member having an elongated, spirally configurated aperture therein, means extending from said gimbal system and aligned with one axis thereof for engaging in said spiral aperture whereby a predetermined angle of tilt is imparted through the gimbal system about an axis normal to said first mentioned axis thereof upon operation of said differential mechanism.

15. A variable pitch propeller comprising propeller blades and a structure for mounting said blades to said shaft including a mechanism for affording preflight adjustments of the blades relative to the shaft mounting structure and means for affording self-balancing movement of the blades during flight relative to said shaft mounting structures, a gimbal system disposed between each blade and said blade mounting structure, a differential mechanism mounted for rotation with said shaft mounting structure and for movement relative thereto and means responsive to movements of said differential mechanism and connected with said gimbal system, said means being constructed and arranged to releasably secure said gimbal system in a predeterminable angle of tilt about an axis substantially perpendicular to the propeller shaft axis.

16. A variable pitch propeller comprising a propeller blade and a mounting structure for securing the blade to said shaft, said structure including part-spherical mounting shell apertured at its crown portion to receive the root end of the blade therethrough, a gimbal system composed of two concentric rings mounted within said part-spherical shell and being tiltably secured thereto at the marginal edge of this part-spherical shell, means to releasably secure the gimbal system at a predetermined angle of tilt about the pivot axis of the inner ring, said system being furthermore adapted for self-balancing tilting movements about the pivot axis of the outer gimbal ring substantially normal to said first named axis, a journal member mounted upon said gimbal system for rotation relative thereto, an enlarged portion at the extreme root end of the blade structure, means for interfitting with said enlarged portion of the blade root to secure the latter in the said part spherical shell against centrifugal forces developed during rotation of the shaft assembly, an adjustably serrated stud aligned and serrated in vernier arrangement in said enlarged portion and in said journal member to afford relative blade angle adjustment between the axis of the blade root and the axis of said journal member, said axis coinciding with the axis of said inner gimbal ring.

HANS REISSNER.